United States Patent [19]

McCabe

[11] 4,338,967

[45] Jul. 13, 1982

[54] UNIVERSAL LINK BAR OPERATOR AND ACTUATOR FOR ROTATING BLADE AIR, SMOKE, AND FIRE DAMPERS

[75] Inventor: Francis J. McCabe, Doylestown, Pa.

[73] Assignee: The United States of America as represented by the United States Department of Energy, Washington, D.C.

[21] Appl. No.: 154,713

[22] Filed: May 30, 1980

Related U.S. Application Data

[60] Continuation-in-part of Ser. No. 16,514, Mar. 1, 1979, which is a continuation-in-part of Ser. No. 905,211, May 12, 1978, Pat. No. 4,183,129, Ser. No. 896,237, Apr. 14, 1978, Pat. No. 4,219,041, Ser. No. 896,299, Apr. 14, 1978, Pat. No. 4,195,384, and Ser. No. 764,774, Feb. 2, 1977, Pat. No. 4,114,646, which is a continuation of Ser. No. 689,994, May 26, 1976, Pat. No. 4,081,173, said Ser. No. 905,211, is a division of Ser. No. 729,813, Oct. 4, 1976, Pat. No. 4,113,232, said Ser. No. 896,299, is a continuation-in-part of Ser. No. 799,044, Mar. 18, 1977, Pat. No. 4,099,292, which is a continuation of Ser. No. 676,483, Apr. 13, 1976, Pat. No. 4,041,570, and a continuation-in-part of Ser. No. 676,413, Apr. 13, 1976, Pat. No. 4,040,304.

[51] Int. Cl.[3] .......................... F24F 13/14; F16K 1/22

[52] U.S. Cl. ...................................... 137/601; 251/58; 251/280

[58] Field of Search .................. 137/601; 251/58, 279, 251/280, 138, 228, 294; 98/121 A; 49/73, 86

[56] References Cited

U.S. PATENT DOCUMENTS

| | | | |
|---|---|---|---|
| 1,487,861 | 3/1924 | Keenan | 49/86 |
| 2,827,259 | 3/1958 | Kindt | 251/228 X |
| 3,062,232 | 11/1962 | McGay | 251/58 X |
| 3,182,951 | 5/1965 | Spencer | 251/280 X |
| 3,510,101 | 5/1970 | Burtis | 251/280 X |
| 3,955,792 | 5/1976 | Cho | 251/294 |
| 3,996,952 | 12/1976 | Root | 137/601 X |

FOREIGN PATENT DOCUMENTS

| | | | |
|---|---|---|---|
| 1049654 | 1/1959 | Fed. Rep. of Germany | 251/138 |
| 1250224 | 9/1967 | Fed. Rep. of Germany | 251/294 |

*Primary Examiner*—Robert G. Nilson
*Attorney, Agent, or Firm*—L. E. Carnahan; Roger S. Gaither; Richard G. Besha

[57] ABSTRACT

A universal operator is disclosed for rotating blade air, smoke and fire dampers, said dampers comprising a frame and a plurality of interconnected blades within said frame, said interconnection being in the form of a link bar which adapts all of said blades to open and close as a unit. The operator comprises a pair of pivotally connected members to form a knee-action joint which in turn is pivotally connected both to the damper frame and to said link bar. The operator also comprises stall type actuation means for selectively acting through the operator to control the degree of blade opening and bias means to return said blades to their normal operating position whenever said actuation means is disengaged.

20 Claims, 12 Drawing Figures

FIG. 1
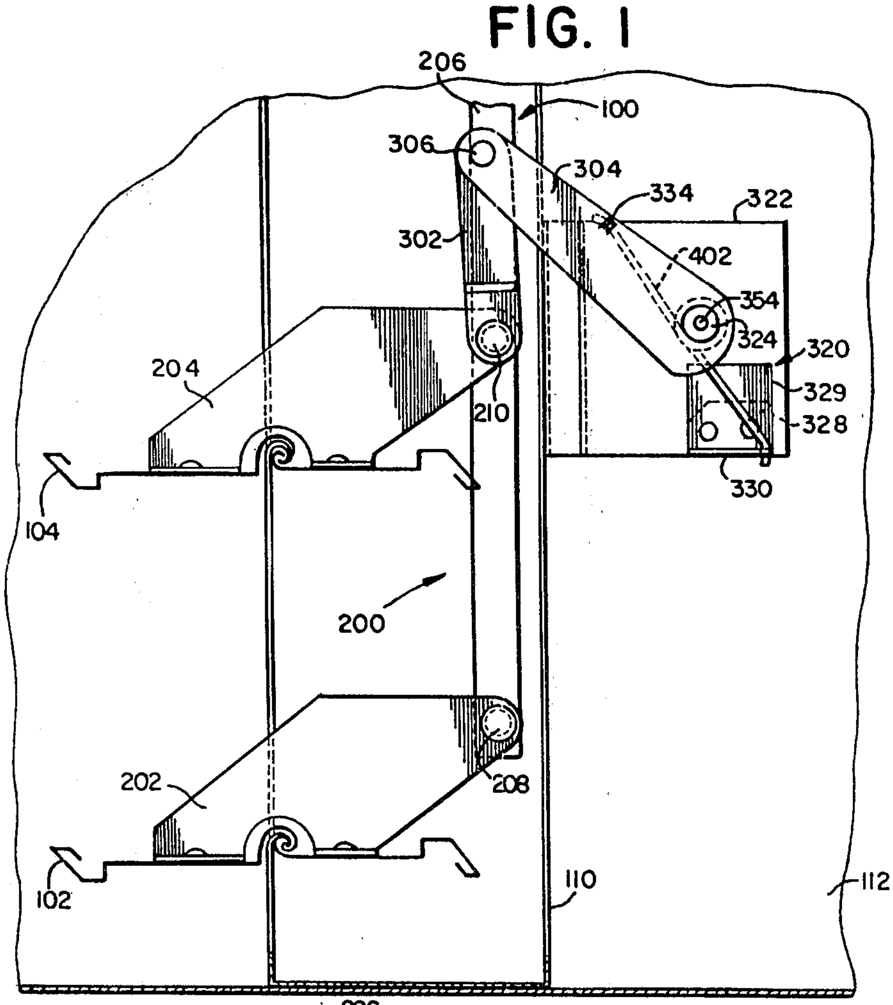
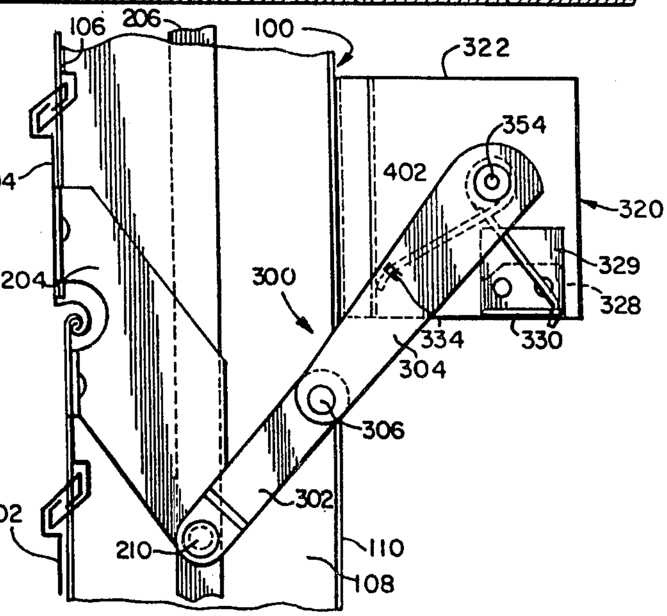
FIG. 2

UNIVERSAL LINK BAR OPERATOR AND ACTUATOR FOR ROTATING BLADE AIR, SMOKE, AND FIRE DAMPERS

CROSS-REFERENCE TO RELATED APPLICATIONS

The present application is a continuation in part of my prior co-pending application Ser. No. 16,514, filed Mar. 1, 1979 entitled "Quadrant Operator" which in turn was a continuation in part of application Ser. No. 896,299, filed Apr. 14, 1978, entitled "Self-esetting Cable Operated Translating Drive Link," now U.S. Pat. No. 4,195,384, issued Apr. 1, 1980. This, in turn, was a continuation in part of application Ser. No. 799,044, filed Mar. 18, 1977, entitled "Telescoping Heat Responsive Releasing Means", now U.S. Pat. No. 4,099,292, issued July 11, 1978, which in turn was a continuation of application, Ser. No. 676,483, filed Apr. 13, 1976, entitled "An Electrical Pneumatic Heat Actuated Fire Link Apparatus", now U.S. Pat. No. 4,041,570, issued Aug. 16, 1977, as well as a continuation in part of application Ser. No. 676,413, filed Apr. 13, 1976, entitled "Clutch Motor for Use in Resettable Fire Damper", now U.S. Pat. No. 4,040,304, issued Aug. 9, 1977, which applications are incorporated herein by reference as if fully set forth herein.

Ser. No. 16,514, was also a continuation in part of patent application Ser. No. 764,774, filed Feb. 2, 1977, entitled "Rotating Blade Fire Damper", now U.S. Pat. No. 4,114,646, issued Sept. 19, 1978. This, in turn, was a continuation of application Ser. No. 689,994, filed May 26, 1976, entitled "Rotating Blade Fire Damper", now U.S. Pat. No. 4,081,173, dated Mar. 28, 1978 which applications are also incorporated by reference as fully set forth herein.

Ser. No. 016,514 is also a continuation in part of patent application Ser. No. 896,237, filed Apr. 14, 1978 entitled "Heat Responsive Locking Clip", now U.S. Pat. No. 4,219,041, and being specifically incorporated herein by reference.

Application Ser. No. 016,514 was also a continuation in part of U.S. patent application Ser. No. 905,211, filed May 12, 1978, entitled "Smoke, Fire and Air Control Damper with Stamped Blade Hinge", now U.S. Pat. No. 4,183,129, issued Jan. 15, 1980, which in turn was a Division of Ser. No. 729,813, filed Oct. 4, 1976, entitled "Smoke Fire and Air Control Damper with Stamped Blade", now U.S. Pat. No. 4,113,232, dated Sept. 12, 1978, each of which applications are hereby incorporated by reference as fully set forth herein.

BACKGROUND OF THE INVENTION

The present invention generally relates to the field of damper operators and is particularly adapted for use with multi-bladed air, smoke or fire dampers, said blades being adpated to open and close as a unit and further, said dampers employing a device to actuate the operator in response to excessive temperature increases in the vicinity of the device or in response to remote signals received thereby. Conventionally, such dampers are provided with blade linkages which articulate the blades with respect to the frame so that the blades will move in unison between their open and closed positions therein. It has long been known that such dampers may be operated using cables attached to the blade brackets or blade linkages within the dampers, which cables are normally threaded through a ferrule disposed damper/duct wall to reach an operator motor outside of the duct in which the damper is located. It is also known to bias the blades toward the closed position, as for example, by using springs extended between the damper frame and the blades, and to provide fusible links in the cable portion located within the duct, so that in response to an excessive temperature, the cable will break and the springs cause the blades to move to the closed position, whereupon the passage of fire through the duct will be halted. Similar, arragements have also been used to provide dampers which are intended to move to the open position in response to a selected stimulus and for air dampers wherein the blades are set to normally operate at an intermediate partially opened position.

Alternatively, it is known to operate dampers through a damper operator shaft, the rotation of which through an arc of approximately 90° corresponds to the rotation of the damper blades through 90° between their opened and closed positions. See, for example, the structure and various damper operators disclosed and discussed in my prior issued U.S. Pat. No. 4,113,232, dated Sept. 12, 1978, entitled "Smoke, Fire and Air Control Damper with Stamped Blade".

Motorized operators for use in rotating damper operator shafts through an arc of 90° are also known. One advantage of such operators is that they normally may be controlled from a remote power source to adjust air flow through the damper by rotating the damper blade preselected number of degrees from the closed toward the open position. In most applications this number is normally assumed to correspond to the percentage of air flow through that damper, for example, a 10° movement of the shaft normally corresponds to a 10° opening of the damper which is assumed to establish a corresponding air flow of approximately 10% through the damper. In actuality, however, the relationship between the arc blade opening and the air flow is not linear. In particular, during the initial stages of blade opening, the fairly large pressure drop encountered causes correspondingly greater percentage volumes of air permitted to pass through the damper for a given degree of blade opening. As the damper blades approach their fully opened position, the pressure drop decreases and correspondingly smaller increases in air flow are achieved for a given change on the degree of blade rotation. No damper/operator unit is presently known having air flow characteristics which exhibit a substantially linear relationship between air flow and degree of operator shaft rotation throughout its entire working range. Furthermore, while shaft operated dampers may be preferred in certain instances, such operators are typically difficult and expensive to install, primarily due to the fact that they normally must be installed to the damper and adjusted after that damper has been installed within the duct. Such a requirement makes installation difficult and expensive, often resulting in an improperly aligned damper/operator combinations. This is particularly true when the damper operator must be specifically designed for a particular damper type of structure. This problem would undoubtedly be much simpler if a universal damper operator were available which could be adapted to a wide variety of damper structures with a minimum of effort.

SUMMARY OF THE INVENTION

The present invention provides a sophisticated, easy-to-install rotating multi-bladed damper operator combination, exhibiting many advantages over those heretofore known to the art. The present operator provides an over center knee-action locking arrangement for insuring that the blades stay in their desired actuated position, even in the presence of excessive heat and/or pressure, such as may be encountered under fire conditions. Once fire actuating conditions have been sensed, the actuator, such as a stall type motor, holds the operator in its actuated position until the fire actuating conditions have passed. At this point, the actuating motor may then either be recycled through its normal arc of travel to automatically reset the damper for continued use or released mechanism so that internal biasing means may automatically return the blades to their open position.

The preferred embodiment operator is readily adaptable for both cable or shaft actuation. Such operators may be constructed to bias the damper blades to their normal operating position before the operator is actuated, against which bias the blades will be locked by the knee-action operator working in conjunction with the actuation means which holds them, so that they cannot be opened until the actuating means is released either manually or, in the preferred embodiment, automatically, after the fire actuating conditions have passed. Furthermore, the device may incorporate stop means which prevent the blades from completely closing or opening in the normal position, as may be the case, in accordance with particular ventilation requirements for air conditioning operations.

In accordance with the preferred embodiment of the present invention, a damper is provided which comprises a plurality of pivotally, interconnected blades which are associated with an external frame and adapted to open and close as a unit said uniting operation being facilitated by a link bar which is pivotally attached to each blade. The operator proper comprises a pair of pivotally connected members, an upper frame associated member and a lower linkage associated member. In operation, the frame associated member defines an arc of about 90° with its pivot point with the linkage associated member which causes the blades to move beween their open and closed positions. The frame associated operator member travels an additional short arc to accomplish the knee action locking of blades.

In the preferred embodiment, actuation of the operator is accomplished by a jack shaft fixedly attached at a right angle to the upper end of said frame associated member. This extends through a sleeve or wall of said frame and its associated duct whereas drive actuating means for said operator are connected thereto. This connection is an actuator arm or plate which fixedly attached to the outer end of said jack shaft at a right angle parallel to the plane of said frame associated member so that a rotational movement of the plate causes a like rotation of the jack shaft and its frame associated member. As hereinabove described, this causes said linkage associated member to rotate as well, thus, causing the knee to either bend or flex, in accordance with the direction of motion of the shaft, thus moving the link bar and causing the blades to open and close as a unit. Biasing means associated with the operator (or other biasing means located elsewhere, if desired) will then, can be set to either drive the link bar into its locked position or retract it from its locked position and move it back towards its opened position. Once locked, substantial forces which may tend to alter the blade position will be resisted by the over-center knee-action locking of the damper operator.

Assembly of the operator is fairly simple. The two piece frame associated/linkage associated member combination is attached to any of the blades in the damper with the longer frame associated member generally varying in size as a function of the damper size. The "locked" position of the knee establishes the position of the jack shaft at which point the jack shaft mount is attached and a hole is drilled through the wall of the frame and its associated duct for the jack shaft in the operator to be inserted therethrough from inside of the duct. The operator drive means is then assembled onto the exterior of the duct and attached to the shaft for completion of the system.

A variety of drive means are available both electric or pneumatic, which when actuated, will cause the jack shaft to rotate as hereinabove described. In the preferred embodiment these are adapted to hold the blades in the actuated position as long as an actuation signal is received. If spring biasing of the operator to "normalize" the blade portion is desired. a coiled spring may be easily applied to engage bias mounting portions which are easily built into the operator jack shaft mount structure. In this manner, no special tools or delicate operations for final installation and the structure may be readily adapted to a wide variety of commercially available damper mechanisms.

Accordingly, a primary object of the present invention is the provision of a simple, reliable, improved link bar operator which is adaptable to a wide variety of commercial air, smoke and fire rotating blade damper structures.

A second object of the invention is the provision of an easily installed damper operator/actuator.

These and other objects of the present invention become apparent from the following more detailed description.

BRIEF DESCRIPTION OF THE DRAWINGS

FIG. 1 is a cross-sectional view of a preferred embodiment damper operator shown, mounted to the linkage means of a damper whose blades are held in the opened position, the entire unit being now shown mounted within a fragmentary of a duct.

FIG. 2 is a fragmentary view of a portion of the damper and operator shown in FIG. 1 wherein the damper operator is in its locked position as a result of the operation of the actuating means associated with said damper operator.

DETAILED DESCRIPTION OF THE PREFERRED EMBODIMENT

Figure 3:
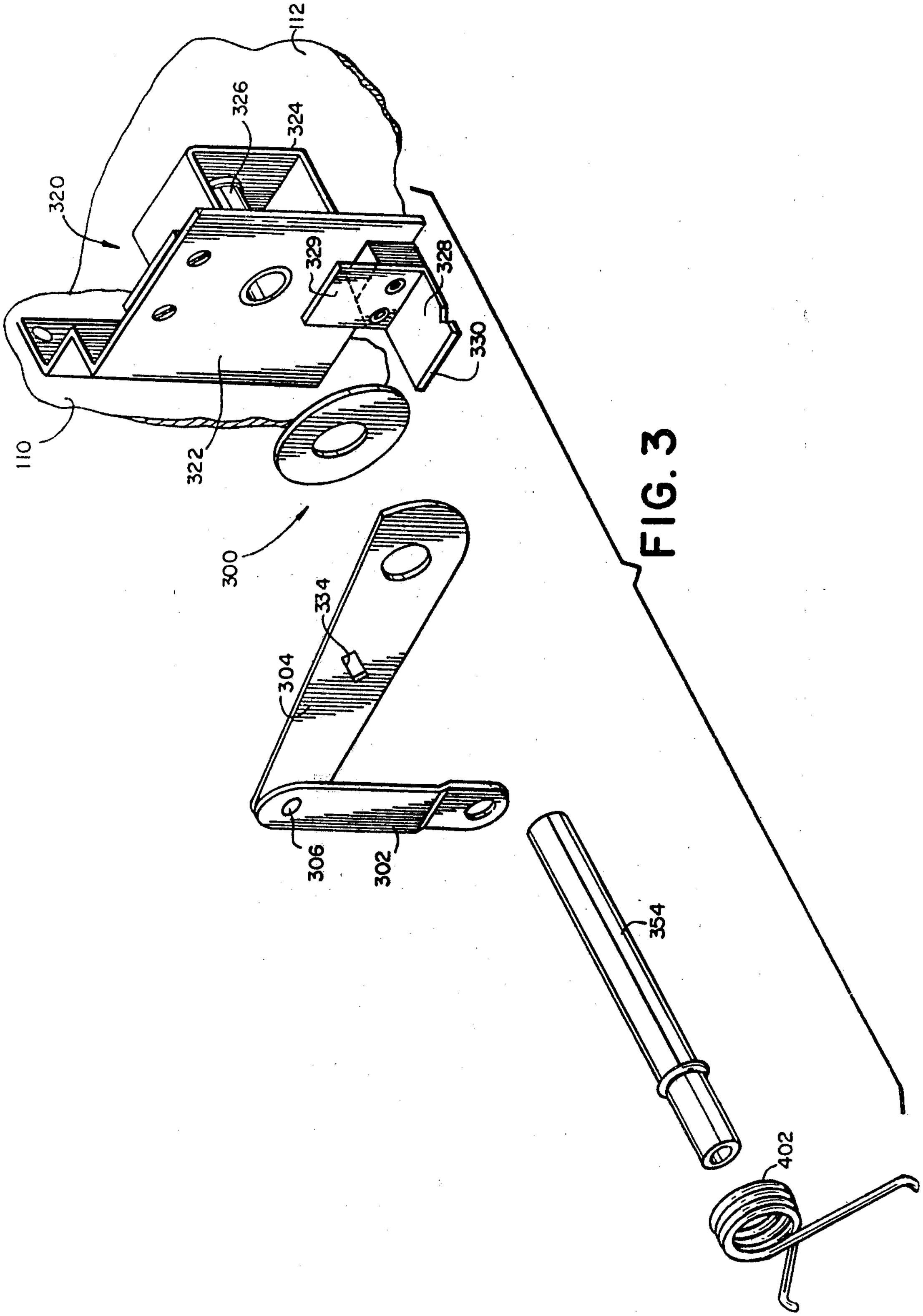
FIG. 3 is an exploded isometric view of the preferred embodiment damper operator illustrated in FIG. 1 showing the assembly of that damper operator.

Although specific forms of the invention have been selected for illustration in the drawings, and the following description is drawn in specific terms for the purpose of describing these forms of the invention, this description is not intended to limit the scope of the invention which is defined in the appendant claims.

The present invention basically comprises an operator for operating an air smoke or fire damper, having a frame and a plurality of interconnected blades, said blades being adapted to rotate within said frame between a first open position and a second closed position with respect to said frame, said interconnection being formed by each said blades being pivotally attached to a link bar to form a combination which acts to open and close said blades as a unit. In its normal installation, this operator is intended to permit or cause closure of the blades to their fully closed position with respect to said frame, as for example, in response to fire actuating conditions such as heat or remote fire alarm signals, and to maintain these blades in the closed position until the fire actuating conditions have passed. In the following description and claims, it is assumed that the normal position of the blades is in the fully open position with respect to the frame, and that they will be closed only in response to a fire stimulated actuation of the drive means. However, one of ordinary skill in this art will understand that if the damper is to be used as a smoke ventilating damper, the normal blade position used may also be the fully closed position, whereupon the damper operator should be mounted so that it assumes the locked position when these blades are fully opened. Lastly, when the damper is to be used for air control purposes it should also be understood that the damper may not operate in either a fully opened or closed position but rather will normally assume some intermediate position so as to permit a controlled, constant amount of air to pass therethrough for ventilation purposes and to either open further or close further only when overload conditions are encountered.

In the drawings, the preferred damper operator is shown in association with a preferred damper designated generally 100, having damper blades 102 and 104 which are disposed within frame 108, having at least one inwardly depending frame flange 110 on which the damper operator may be mounted. In FIGS. 1 and 2, this damper is shown mounted within a duct 112. For additional details relating to a preferred embodiment rotating blade damper which may be used with the operator of the present invention, please refer to the above cross-referenced patent applications and patents relating to such dampers, the disclosures of which have been incorporated herein by reference. However, it is not intended to limit the uses of the present invention to dampers of this particular design. In FIG. 1, the illustrated damper is seen to comprise linkage means 200 for articulating the blades with respect to the frame. This linkage means comprises blade brackets 202 and 204, link bar 206 and link bar pivots 208 and 210. Movement of the linkage bar through an arc defined by the radius between its pivots 208 and 210 and their respective blade pivots causes the blades to move between their opened and closed positions.

FIGS. 1, 2 and 3 the preferred embodiment link bar operator designated generally 300 is illustrated. This damper operator comprises linkage associated operator member 302 and frame associated operator member 304 which are pivotally interconnected by operator member pivot 306 to form a knee action joint. The linkage associated operator member 302 is pivotally mounted to link bar 206 at one of the link bar pivots and with respect to the damper frame by mounting means 320. This mounting means, as shown most clearly in FIG. 3, comprises a frame mounting bracket 322 which is connected to frame flange 110, a bushing bracket 324 connected to the frame mounting bracket and bushing means 326 for defining a bore in the mounting means to receive drive shaft 354. A stop means 330 for limiting the arc of rotation of at least the frame associated member 304, the stop means defines an over-center position wherein the operator member pivot 306 has passed over a line described by the link bar pivot 210 which connects a linkage associated operator 302 to the linkage and drive shaft 354 which is fixedly attached to frame associated operator member 304 and which pivotally connects it to the frame through frame mounting bracket 322. This over-center position locks the knee joint, thus enabling it to effectively resist any "opening" forces which may be transmitted to the operator through linkage bar 206 such as may result under fire actuating conditions.

In the preferred embodiment, the mounting means additionally comprises an L-shaped bracket 329, having a stop means portion 330 and actuator interlock portion 332. The actuator interlock portion cooperates with bias mounting pin 334 and the protruding portion of shaft 354 to act as a mount for an optional biasing spring 402. As shown in FIGS. 1 and 2, this biasing spring 402 biases the frame associated member 304 into its over-center locked position, that is, as shown it acts to keep the damper normally closed, such as would be the case with a fire/smoke damper. Here, under normal operating conditions, the actuator means would cause the rotation of frame associated member in a direction away from the over-center locking position to unlock the knee and open the blades. For a damper which is normally in the open position the spring bias arrangement would be reversed.

Figure 4:
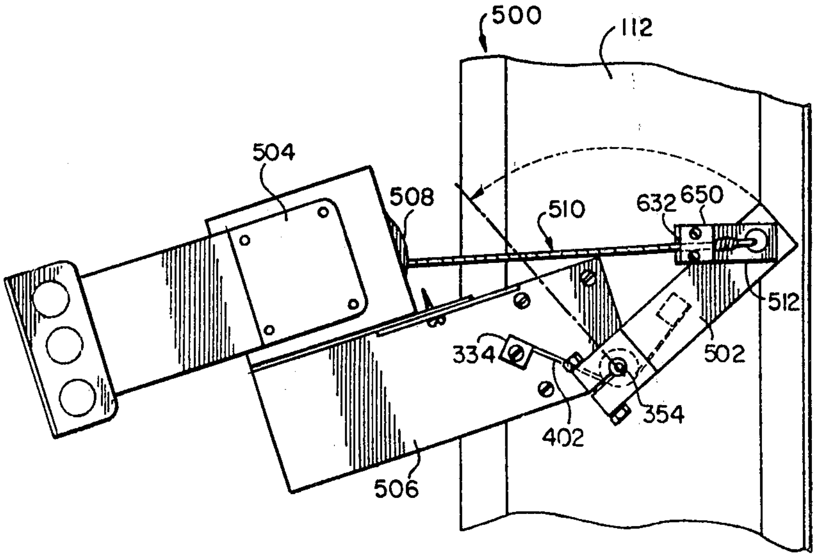
FIG. 4 an external view of an actuator for the device shown in FIG. 1 showing a stall type electric motor as the drive means in the power open/spring closed position.
Figure 6:
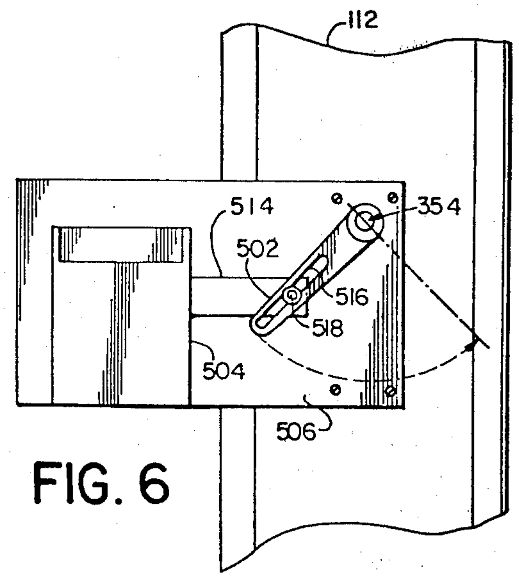
FIG. 6 is an alternative embodiment of the drive means wherein it is an electric oscillating linkage motor in the power open configuration.
Figure 8:
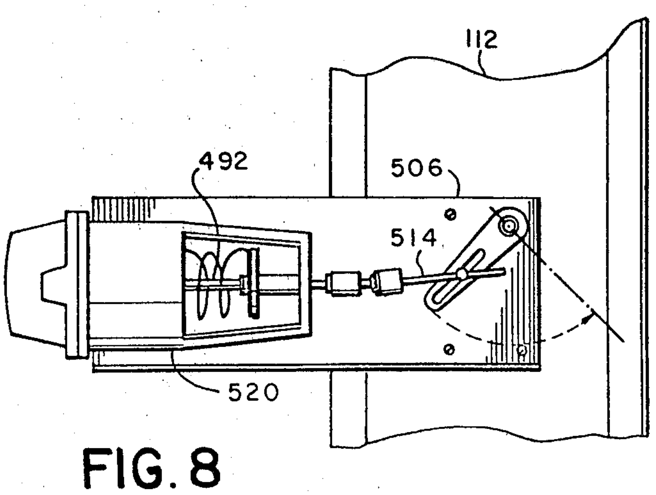
FIG. 8 is a second alternative embodiment of the drive means wherein it is in a pneumatic operator in the power open configuration.

In the preferred embodiment the above-mentioned operator means comprises a shaft means for selectively causing the rotation of the frame associated member in the first direction. FIGS. 1 and 2 show a such an operator wherein drive shaft 354 extends through washer 355, mount means 320 and then through duct wall 112 to connect with an externally mounted actuation means 500. In FIGS. 4, 6 and 8, three types of motor drives for actuation means 500 are illustrated. In all of these, shaft 354 is provided with an actuator plate 502 which is rigidly attached to it at a right angle to the shaft for rotation therewith.

Figure 5:
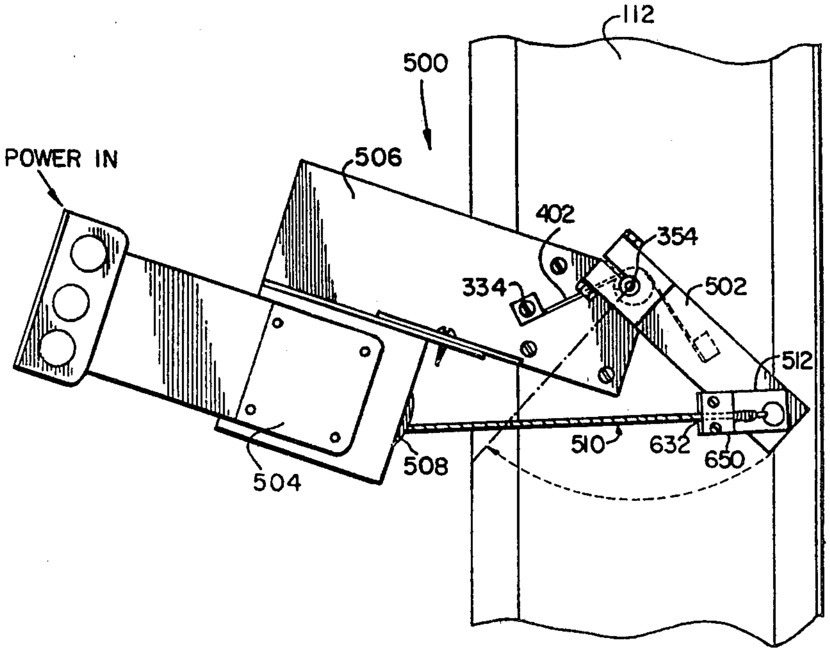
FIG. 5 is the drive means of FIG. 4 in the power closed/spring open configuration.

Referring now to FIGS. 4 and 5, alternative mounting arrangements of drive motor 504 are shown, depending on whether power open/spring closed or power closed/spring open operation is desired. In both cases, motor 504 is positioned on mounting plate 506 at a distance somewhat remote from actuator plate 502. Fixedly attached to the shaft of the motor is a take-up pulley 508 to which one end of actuator cable 510 is attached, the other end of cable 510 being pivotally attached to actuator plate 502 at a connection point 512 located near its outermost end. For illustrative purposes, spring 402 is shown here outside of duct 112.

Drive motor 504 is shown in a normally "off" position so that bias spring 402 is untensed to keep the blades in the normal position - open or closed as the case may be. When a fire actuating actuation is sensed, either by one of a variety of thermal sensors within the duct or by a remote fire or smoke detector the motor is converted to an "on" status causing it to rotate with the result that pulley 508 begins to take up cable 510; said take up also causing the actuator arm/drive shaft/frame associated member combination to rotate toward their activated position, tensing bias spring 402, until the knee-action joint of link bar operator 300 locks in place. Motor 504 is a stall type motor so that it will stop rotation when stop means 328 limits the further rotation of frame associated member 304, and remain locked in this position as long as an actuation voltage is received.

After the fire event ceases the activation voltage is cut off thus releasing the motor shaft so that pulley 510 can rotate freely under the stimulus of tensed bias spring 402 to pay out cable 510. This unlocks the knee joint and allows return of the blades to their normal operating position.

Figure 7:
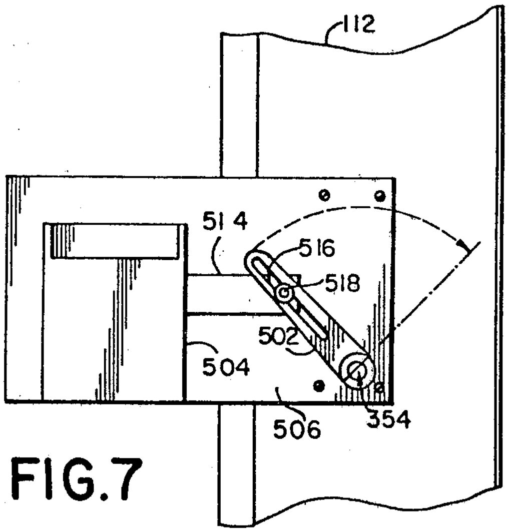
FIG. 7 is the drive means of FIG. 6 in the power closed configuration.
Figure 9:
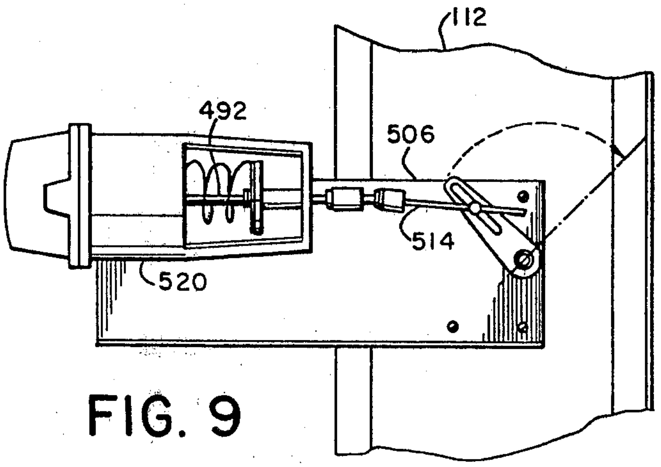
FIG. 9 is the drive means of FIG. 8 in the power closed configuration.

Alternative actuator drives are also possible and FIGS. 6–9 show two of these. In FIGS. 6 and 7, cable 510 has been replaced a rigid oscillator arm 514 which slideably engages the, slot 516 on actuator arm 502. Activation/deactivation causes a reciprocal motion in arm 514 which acts to operate the damper in the same manner as described above. In FIGS. 8 and 9, motor 504 is replaced with a pneumatic cylinder 520. As shown here, bias spring 492 is mounted within the cylinder housing, thus simplifying one aspect of the installation of the system.

Figure 10:
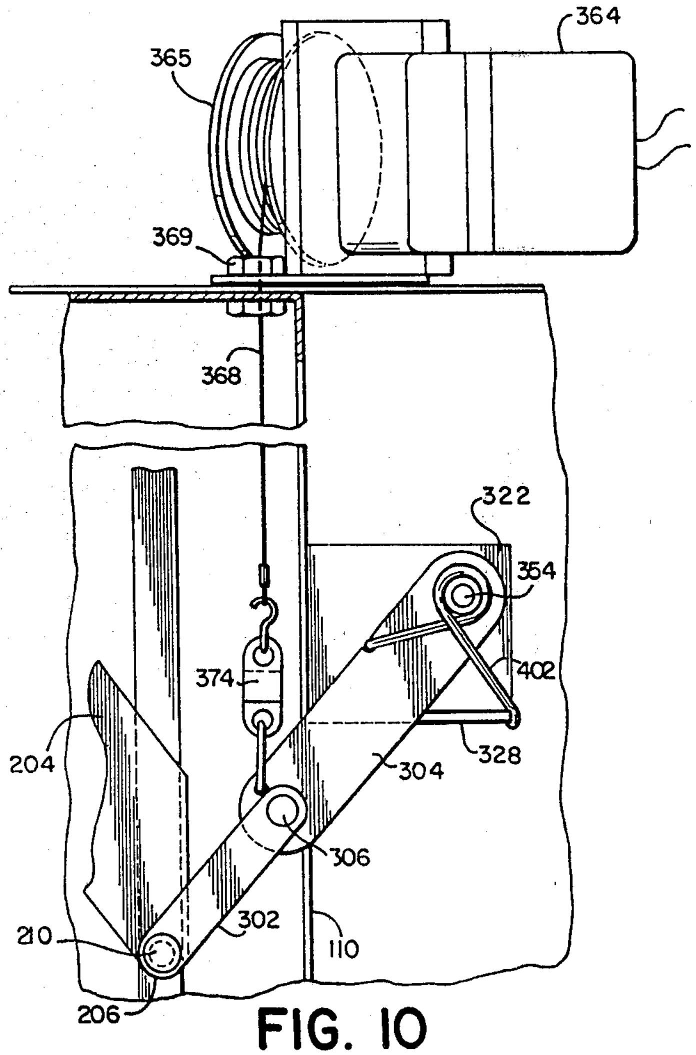
FIG. 10 is a cross-sectional view of a portion of a damper and a second alternative embodiment of the operator and a motor cable actuator.

In FIG. 10 a cable actuated embodiment is shown which also retains many of the advantages of preferred embodiments illustrated in FIGS. 1 to 9. In this embodiment, the frame associated member 304 is pivotally connected to frame mounting bracket 322 by drive shaft 354 which extends outwardly therefrom. Stop means 328 acts to define the over-center locked position of the frame associated member 304 and confines the knee-action joint in the manner described above in connection with the embodiment of FIGS. 1 to 3. However, actuator plate 502 and mounting plate 506 are not necessary in this embodiment and the spring 402 spans between one edge of the stop means 328, around a protruding portion of pivot jack shaft 354 to an offset slot portion of the frame associated member 304. In this particular orientatiOn, it acts in the same manner as in the embodiment shown in FIGS. 1 and 2 above. In the embodiment of FIG. 10 the actuator means for selectively causing rotation of the frame associated member at least in the first direction away from the over-center position comprises a motor designated generally 364 having a rigidly attached pulley 365 which acts to reel in a cable 368 which is threaded through ferrule 369 to the damper operator mechanism. In the embodiment shown, a fusible link 374 is associated with cable 368 and also is connected to one of the operator members, preferrably the frame associated member 304, in the vicinity of operator member pivot 306. In this manner, by causing the motor operator 364 to draw the cable in the direction of the arrow shown in FIG. 10, the damper will be caused to move between its closed and opened positions.

In addition to the advantages described above, the novel operator arrangement disclosed in FIGS. 1 through 9, possesses the additional advantage of providing improved operator/damper actuation air flow characteristics, wherein, during the initial phases of the opening of the damper using the preferred embodiment operators, relatively less blade rotation is accomplished for a given percentage of operator actuation. This phenomenon results from the fact that the paths of initial movement of the operator pivot member 306 and linkage rod 206, and more particularly, linkage rod pivot 210 are transverse at the beginning of the cycle which opens the blade, while the paths of these arcs converge as the blades and operator approach the fully opened positions. Accordingly, at the beginning of the opening cycle, a given degree of actuation will produce relatively less rotation of the blades than at the end of the opening cycle, wherein the arcs defined by the linkage rod in the operator member pivot 306 are substantially coincident. Accordingly, it is within the scope of the present invention to measure the air flow characteristics of a given damper with which the operator of the present invention is to be used, to alter the various radii of the operator members 302 and 304 and the blade bracket 204, and to further alter the length of the operating arc and locking arc or the actuator so that a given arc of actuator rotation will correspond in a substantially linear fashion to the percentage of air flow through the damper which is associated therewith.

Figure 11:
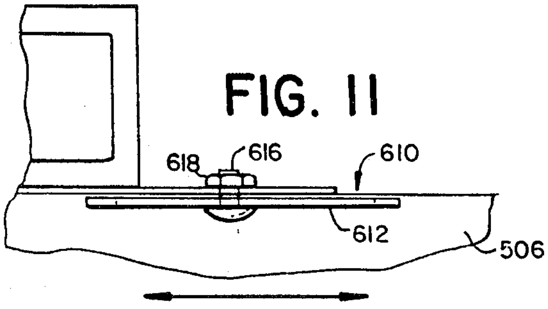
FIG. 11 is a side view of a ventilator stop used with the subject invention.
Figure 12:
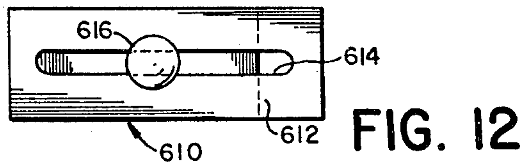
FIG. 12 is an end view of the stop shown in FIG. 11.

Also shown in FIG. 4 is one additional feature of the damper operators disclosed herein. It was noted above that in addition to their utility for fully opening and/or closing dampers for smoke or fire control, the subject operator could also be used for flow control purposes in air-conditioning systems as well. In such applications, in order to assure that the system is balanced correctly, it is usually necessary to assure that some adjustment means for flow control is available. This is accomplished by using an adjustable retaining means 610, one version of which is shown in greater detail in FIGS. 11 and 12. As shown, the adjustable retaining means 610 is mounted on mounting plate 506 to strike actuator plate 502 at an intermediate point along its arc of travel. Adjustment is performed by moving stop plate 612 along the top of mounting plate 506. This is slideably mounted in adjustment slot 614 by threadable stud 616. Locking of plate 612 is accomplished by tightening nut 618. Thus, the adjustable retaining means 610 may be used to prevent the blades from fully returning to the open position, controlling the amount of air flowing through the system.

It should be understood that the drive means is not limited to use with the operator mechanism shown and that other types of operator mechanisms, such as those illustrated in FIGS. 1–6 of my copending application Ser. No. 16,514, filed Mar. 1, 1979 and entitled "Quadrant Operator", can also be used and that such use is anticipated.

It will also be understood that various changes in the details, materials and arrangements of parts which have been herein described and illustrated, in order to explain the nature of this invention may be made by those skilled in the art within the principal and scope of the invention as expressed in the following claims:

What I claim is:

1. An operator for operating a parallel, multi-blade damper having a frame and at least one blade adapted for rotation within the frame between an open position and a closed position, wherein said operator comprises:

(a) at least two, pivotally interconnected operator members, a first operator member being operatively associated with the frame of the damper and a second operator member being operatively associated with the damper blade; and (b) actuator means operatively associated with at least one of the two operator members;

wherein operation of the actuator means causes articulation of the operator members, which in turn causes rotation of the damper blade, so that the amount of rotation of the damper blade which is caused by a given amount of operation of the actuator means increases as the damper blade moves toward the open position.

2. The operator of claim 1 wherein the actuator means is cable operated.

3. The operator of claim 2 wherein the actuator means comprises:

(a) a pulley operatively associated with a motor;

(b) a cable, a first end of which is attached to the pulley so that the cable will become wound around the pulley in response to operation of the motor and a second end of which is attached to one end of the operator members in the vicinity of the pivotal interconnection.

4. The operator of claim 3 wherein the actuator means further comprises biasing means operatively associated therewith.

5. The operator of claim 3 wherein the motor and pulley are located externally of the frame of the damper, and the cable is threaded through a ferrule which communicates with the interior of the frame of the damper.

6. The operator of claim 1 wherein the actuator means is an electrically operated motor.

7. The operator of claim 1 wherein the actuator means is a pneumatically operated motor.

8. An operator for operating a damper having a frame and at least one blade adapted for rotation within the frame between an open position and a closed position, wherein said operator comprises:

(a) at least two, pivotally interconnected operator members, a first operator member being operatively associated with the frame of the damper and a second operator member being operatively associated with the damper blade; and (b) actuator means operatively associated with at least one of the two operator members and comprising:

(i) a pulley operatively associated with a motor;

(ii) a cable, a first end of which is attached to the pulley so that the cable will become wound around the pulley in response to operation of the motor; and (iii) an actuator plate, one end of which is engaged by the second end of the cable and the other end of which is engaged by a shaft operatively associated with the first operator member;

wherein operation of the actuator means causes articulation of the operator members, which in turn causes rotation of the damper blade, so that the amount of rotation of the damper blade which is caused by a given amount of operation of the actuator means increases as the damper blade moves toward the open position.

9. The operator of claim 8 wherein the actuator means further comprises biasing means operatively associated therewith.

10. The operator of claim 8 wherein the actuator means further comprises means for limiting rotation of the damper blade within the frame, thereby establishing a minimum or maximum air flow therethrough.

11. The operator of claim 10 wherein the limiting means comprises a bracket pivotally associated with the actuator plate and a bearing plate connected to the bracket so that the second end of the cable is engaged between the bracket and the bearing plate.

12. The operator of claim 10 wherein the limiting means comprises a bracket associated with the actuator means and an adjustable plate which variably engages the bracket.

13. The operator of claim 1 or 8 wherein the operator further comprises stop means for limiting articulation between the operator members.

14. The operator of claim 13 wherein the stop means is configured so that when articulation between the operator members is limited, the operator members are substantially longitudinally aligned with each other, thereby defining an over-center position.

15. The operator of claim 14 wherein the blade of the damper is locked in position when the operator members assume the over-center position.

16. The operator of claim 15 wherein the blade of the damper is locked in a closed position.

17. An operator for operating a damper having a frame and at least one blade adapted for rotation within the frame between an open position and a closed position, wherein said operator comprises:

(a) at least two, pivotally interconnected operator members, a first operator member being operatively associated with the frame of the damper and a second operator member being operatively associated with the damper blade; and (b) actuator means operatively associated with at least one of the two operator members and comprising an actuator plate, one end of which is engaged by a shaft operatively associated with the first operator member, and having a longitudinal slot capable of receiving a pivotal connection therein, which pivotal connection is operatively associated with a motor;

wherein operation of the actuator means causes articulation of the operator members, which in turn causes rotation of the damper blade, so that the amount of rotation of the damper blade which is caused by a given amount of operation of the actuator means increases as the damper blade moves toward the open position.

18. The operator of claim 17 wherein the actuator means further comprises means for limiting rotation of the damper blade within the frame, thereby establishing a minimum or maximum air flow therethrough.

19. The operator of claim 18 wherein the limiting means comprises a bracket pivotally associated with the actuator plate and a bearing plate connected to the bracket so that the second end of the cable is engaged between the bracket and the bearing plate.

20. The operator of claim 18 wherein the limiting means comprises a bracket associated with the actuator means and an adjustable plate which variably engages the bracket.

* * * * *

UNITED STATES PATENT OFFICE
CERTIFICATE OF CORRECTION

Patent No. 4,338,967 Dated July 13, 1982

Inventor(s) Francis J. McCabe

It is certified that error appears in the above-identified patent and that said Letters Patent are hereby corrected as shown below:

On the title page, delete.

"[73] Assignee: The United States of America as represented by the United States Department of Energy, Washington, D.C."

On the title page at [56], last two lines:

Change "L. L. Carnahan; Roger S. Gaither; Richard G. Besha" to --Benasutti Associates, Ltd.--

Signed and Sealed this

*Eighth* Day of *February 1983*

[SEAL]

*Attest:*

GERALD J. MOSSINGHOFF

*Attesting Officer* *Commissioner of Patents and Trademarks*